Patented Jan. 5, 1943

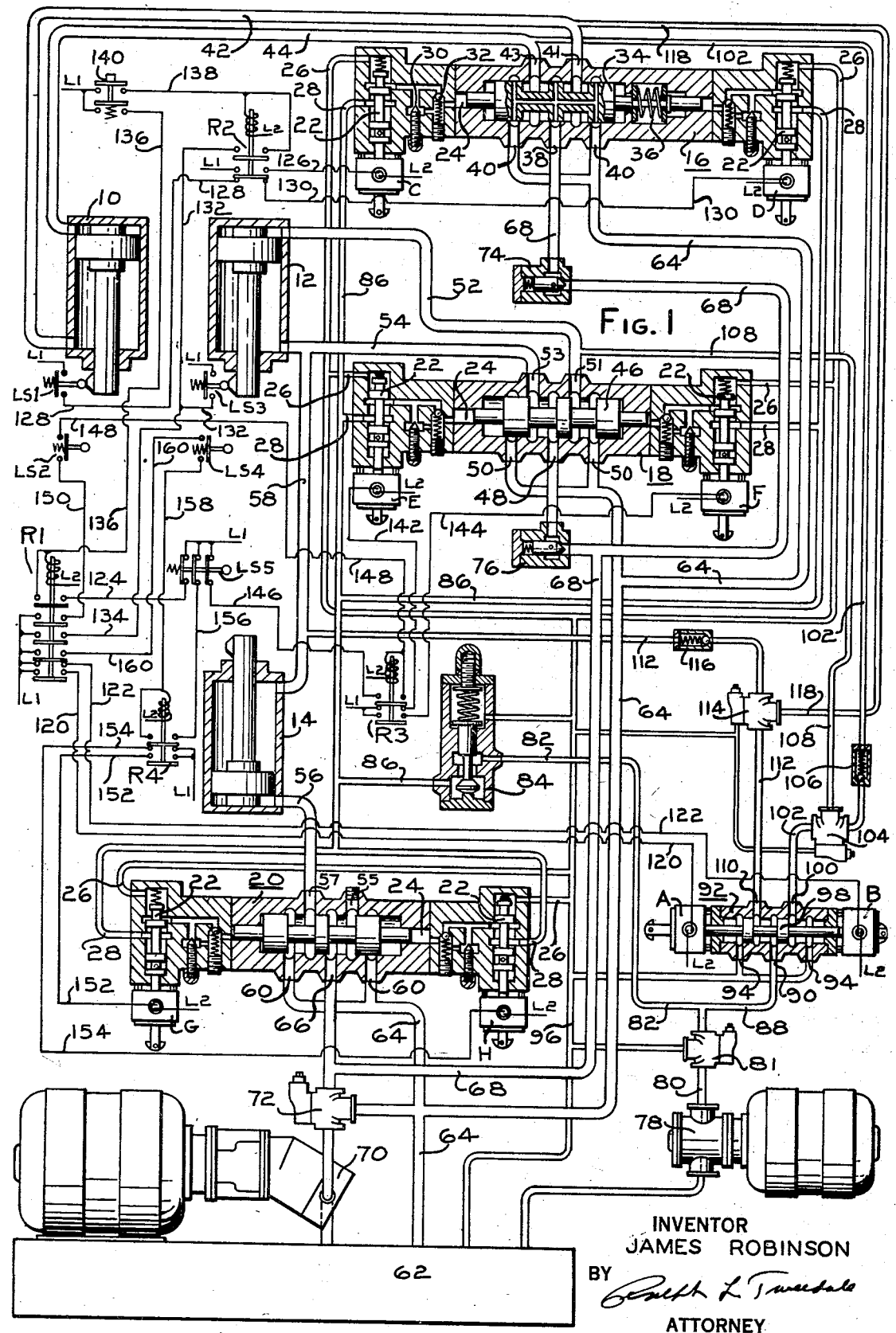

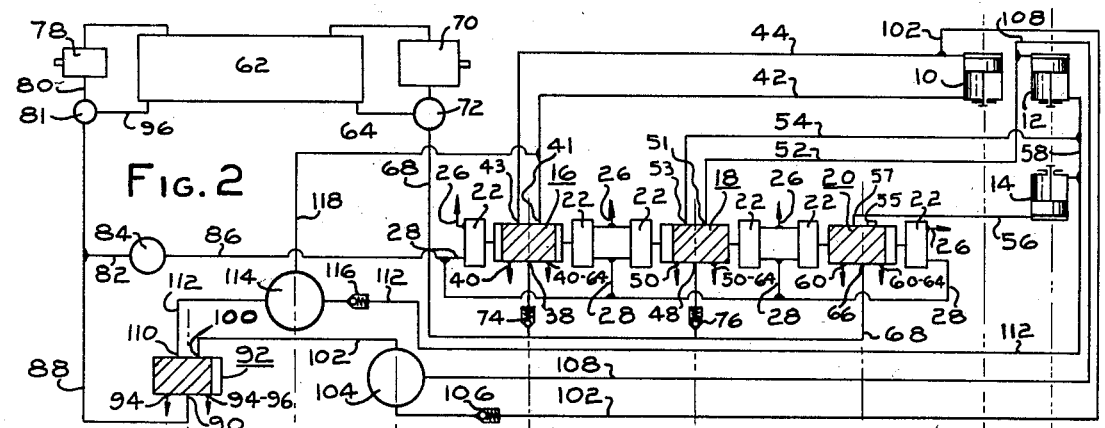

2,307,544

UNITED STATES PATENT OFFICE 2,307,544

POWER TRANSMISSION

James Robinson, Detroit, Mich., assignor to Vickers Incorporated, Detroit, Mich., a corporation of Michigan Application March 23, 1940, Serial No. 325,537

3 Claims. (Cl. 60—52)

This invention relates to power transmissions and more particularly to those of the type comprising two or more fluid pressure energy translating devices, one of which may function as a pump and another as a fluid motor.

The invention is more particularly concerned with a hydraulic power transmission system for operating a plurality of hydraulic motors in sequence such as are used, for example, in a hydraulically-operated, triple-action press. It is desirable in systems of this character to avoid the use of individual pumps for each of the fluid motors, particularly in larger machines where the large volume and high pressure requirements necessitate an expensive pump. In machines of this character, where only one pump is available to supply fluid to the motors in sequence, it is found difficult to hold pressure on one motor which has completed a stroke while the next motor is moving through its stroke and encountering resistance lower than that at the first motor.

It is an object of the present invention to provide a hydraulic power transmission system for operating a plurality of fluid motors in sequence and wherein pressure once built up at one motor may be maintained regardless of how low is the pressure required to operate the next motor.

A further object is to provide in a system of this character an improved auxiliary pump circuit for maintaining pressure on one motor while another motor is operating at a lower pressure by the main pump.

A further object is to provide a system of the character described wherein the auxiliary pump is effective both during forward and return strokes of each motor.

Further objects and advantages of the present invention will be apparent from the following description, reference being had to the accompanying drawings wherein a preferred form of the present invention is clearly shown.

In the drawings:

Figure 1 is a diagrammatic view of a power transmission system embodying a preferred form of the present invention.

Figure 2 is a circuit diagram with a table showing the positions of the various valves during several conditions of operation.

Referring now to Figure 1 there is shown three fluid motors 10, 12 and 14, each of which is represented diagrammatically as a simple piston-and-cylinder type of motor. These motors may serve to actuate the outer slide, the inner slide, and the lower or main slide of a triple-action metal-drawing press, it being understood that any of the well-known forms of double-acting hydraulic motors conventionally used for presses of this character may be used in place of the form of motor illustrated.

Three pilot-operated, solenoid-controlled, directional valves are illustrated at 16, 18 and 20. Each of these valves is provided with similar solenoid pilot-control assemblies, one at either end of the valve, for shifting the spool thereof. Each of these assemblies may consist of a three-way pilot valve 22 normally spring-biased downwardly and adapted to be lifted upon energization of the solenoid associated therewith at the lower end. In its lower position the valve 22 connects its associated operating chamber 24 with a tank connection 26, and, when lifted to its upper position, transfers the operating chamber 24 to communication with a pilot pressure connection 28. Suitable needle and check valves 30 and 32 may be provided for controlling the speed of movement of the spool of the main valve. Thus, whenever a pilot valve 22 is shifted upwardly by energization of its associated solenoid, pilot pressure will be admitted to that end of the main valve for causing the spool thereof to shift away from the pilot valve which was operated.

The valve 16 has a three-land spool 34 which is normally centered by a spring 36. The tool 34 is provided with a central bore and radial passages for connecting the pressure port 38 with the tank ports 40 when the spool 34 is in its central position. The two motor ports 41 and 43 of valve 16 connect by conduits 42 and 44 with the opposite ends of motor 10.

The valve 18 is similar to the valve 16 except that the spool 46 thereof is not provided with the central bore, and the spring-centering means is omitted. It is provided with a pressure port 48, tank ports 50, and has its cylinder ports 51 and 53 connected to the opposite ends of motor 12 by conduits 52 and 54.

Valve 20 is similar to valve 18 except that one motor port 55 is plugged while the other, 57, is connected by a conduit 56 to the head end of the motor 14. The rod end of the latter connects by a conduit 58 with the conduit 54.

The tank ports 60 of valve 20 and also the tank ports 40 and 50 of valves 16 and 18 are connected to a suitable reservoir or tank 62 by a conduit 64. The pressure port 66 of valve 20 and the pressure ports 38 and 48 of valves 16 and 18 are connected by a delivery conduit 68 with the discharge side of a suitable high-pressure pump 70 having sufficient volumetric capacity to supply the requirements of each of the motors 10, 12 and 14. The usual relief valve 72 may be incorporated in the delivery line 68 for limiting the pressure therein to a safe value. The conduit 68 is in direct communication with port 66 of valve 20 and communicates with ports 38 and 48 of valves 16 and 18 through check valves 74 and 76, respectively. The solenoids for shifting the valves 16, 18 and 20 to the right and left are designated C, D, E, F, G, and H, respectively.

An auxiliary pump 78 of the high-pressure type, but having a much smaller volumetric capacity than pump 70, has a delivery conduit 80 which extends by a branch 82 to a pressure-reducing valve 84 of conventional construction. A suitable relief valve 81 may be incorporated in conduit 80. From the reducing valve 84 a pilot pressure conduit 86 extends to the pilot pressure connection 28 of each of the pilot valves 22. A branch delivery conduit 88 extends to the pressure port 90 of a solenoid-operated, four-way valve 92, the tank ports 94 of which are connected to tank by a conduit 96. The valve 92 has a two-land spool 98 adapted to be shifted to the right and left, respectively, by solenoids designated A and B. One motor port 100 connects by a conduit 102 through a relief valve 104 and check valve 106 to the motor conduit 44. The discharge port of relief valve 104 connects by a conduit 108 with the motor conduit 52. The other motor port 110 of the valve 92 connects by a conduit 112 through a relief valve 114 and check valve 116 with the motor conduit 58. The discharge port of relief valve 114 connects by a conduit 118 with the motor conduit 42.

For the purpose of controlling energization of the solenoids of the various valves an electrical circuit is provided as follows: A holding relay $R^1$ has a normally open circuit at the bottom adapted, when closed, to establish connection between one side of a suitable power source, designated $L^1$, and a conductor 120 extending to the solenoid A, the other side of which is connected to the other side of the power source $L^2$. Relay $R^1$ also has a normally closed circuit adapted to connect between $L^1$ and a conductor 122 extending to the solenoid B and therethrough to the line $L^2$. The relay $R^1$ also has three additional sets of normally open contacts and a set of holding contacts. The latter connect between the operating coil of the relay and a conductor 124 extending to one set of normally closed contacts of a limit switch $LS^5$ adapted to be opened whenever the motor 14 has shifted the piston thereof to the upper limit of its stroke.

A second holding relay $R^2$ has a set of normally open contacts adapted, when closed, to connect between line $L^1$ and a conductor 126 extending to the solenoid C and therethrough to the line $L^2$. A normally closed set of contacts on the relay $R^2$ connects between a conductor 128 and a conductor 130 extending to the solenoid D and therethrough to the line $L^2$. The conductor 128 extends from line $L^1$ through a normally-closed limit switch $LS^1$ adapted to be opened when the piston of motor 10 is at the upper limit of its stroke. The relay $R^2$ also has holding contacts which connect between the operating coil of the relay and a conductor 132 extending to a limit switch $LS^3$ normally closed and adapted to be opened when the piston of motor 12 is at the upper limit of its stroke. A branch conductor 134 also extends from conductor 132 to one of the normally-open set of contacts at relay $R^1$. For the purpose of initially energizing relays $R^1$ and $R^2$ conductors 136 and 138 extend from the operating coils thereof to independent contacts of a normally-open, push-button, starting switch 140 and to line $L^1$.

A holding relay $R^3$ has normally closed and normally open contacts connecting by conductors 142 and 144 with the solenoids E and F. Its holding contacts connect by a conductor 146 with one set of normally closed contacts at limit switch $LS^5$. The operating coil of relay $R^3$ may be energized through a conductor 148 extending to a normally-open limit switch $LS^2$ and from there by a conductor 150 to a second set of normally open contacts at the relay $R^1$.

A holding relay $R^4$ has normally open contacts and normally closed contacts connecting by conductors 152 and 154 with the solenoids G and H, respectively. The holding contacts of relay $R^4$ connect by a conductor 156 with the third set of normally closed contacts at limit switch $LS^5$. For the purpose of energizing the coil of relay $R^4$ a conductor 158 extends through a normally-open limit switch $LS^4$ adapted to be closed when the piston of motor 12 reaches the bottom of its stroke, and from there a conductor 160 extends to the third set of normally open contacts at relay $R^1$.

In operation, with the pumps 70 and 78 being driven by their respective prime movers and with the parts in the position illustrated in Figure 1 and in the first line of the table of Figure 2, the apparatus is at rest with solenoids B, E and H energized. All of the holding relays are at this time deenergized, and thus solenoid B is energized from the normally closed contacts of relay $R^1$ through conductor 122. Solenoid D is not energized through the normally closed contacts of relay $R^2$ because the limit switch $LS^1$ is open, thus breaking the circuit of conductors 128 and 130. Solenoid E is energized through the normally closed contacts of relay $R^3$ and conductor 142. Solenoid H is energized through the normally closed contacts of relay $R^4$ and conductor 154.

Since neither solenoid C nor solenoid D is energized, valve 16 is permitted to center by spring action thus bypassing the delivery of pump 70 from delivery conduit 68 through port 38, through the central bore of spool 34 and through tank port 40 and conduit 64 to tank. The energization of solenoid E holds the spool 46 of valve 18 to the right, but since no pressure is available in conduit 68 no flow takes place through the valve 18. Similarly because solenoid H is energized the spool of valve 20 is shifted to the left but this merely connects pressure port 68 to the plugged cylinder port and exhausts the motor conduit 56 to the tank conduit 64.

When it is desired to start a complete operating cycle of the three motors 10, 12 and 14 in sequence, the starting switch 140 is depressed which energizes the relays $R^1$ and $R^2$ through conductors 136 and 138, respectively. Both these relays pick up and hold up because their holding circuits are closed through conductor 124 and $LS^5$ in the case of relay $R^1$ and through conductors 132 and 134 and relay $R^1$ in the case of the other relay. The energization of relay $R^1$ deenergized solenoid B and energized solenoid A through conductor 120. The picking up of relay $R^2$ energized solenoid C through conductor 126. Accordingly the spool of valve 16 is shifted to the right admitting pressure oil from port 38 to the motor conduit 44 and causing the piston of motor 10 to descend. This condition of operation is illustrated in line 2 of the table. As a motor 10 completes its stroke the limit switch $LS^2$ is contacted thus establishing a circuit from relay $R^1$ through conductor 150 and conductor 148 to the operating coil of relay $R^3$. The latter picks up and holds up by the establishment of the holding circuit 146 at $LS^5$. Relay $R^3$ accordingly deenergizes solenoid E and energizes solenoid F through conductor 144. The spool 46 of valve 18 accordingly shifts to the left admitting pressure oil from port 48 to conduit 52 thus moving the piston of motor 12 downwardly, which condition appears in line 3 of the table.

It will be noted at this time that both motors 10 and 12 are in communication with a common delivery line 68 and that the motor having the least resistance would otherwise determine the maximum pressure in this delivery line. Thus if the motor 10 were stalled against work at a high pressure, the shifting of valve 18 would open the pump delivery line to a freer path of escape and thus permit the pressure to fall off at motor 10 due to unavoidable leakage across the piston thereof. This is avoided by the present invention by the provision of the auxiliary pump 78 which, at the present stage of the cycle, is delivering oil through delivery conduit 80, branch 88, ports 90 and 100 of valve 92, conduit 102 to conduit 44 and the head end of motor 10. Thus the delivery of pump 78 is directed to motor 10 and cannot pass back through delivery line 68 due to the check valve 74. This constant small delivery is fed into motor 10 at whatever rate is necessary to make up for any leakage losses in that portion of the circuit, the remainder of the delivery of pump 78 being bypassed over the relief valve 104 and through conduit 108 to the motor conduit 52 and motor 12. It should be noted before proceeding that during the downward movement of the piston of motor 10 the full delivery of pump 78 was directed into the head end of motor 10 to add to the delivery of pump 70 and thus slightly increase the speed of action thereof.

As soon as the piston of motor 12 completes its stroke to the bottom, the limit switch $LS^4$ is contacted thus establishing the pick-up circuit for relay $R^4$ through conductors 160 and 158, relay $R^1$ at this time remaining energized. Relay $R^4$ immediately holds up due to the closure of limit switch $LS^5$ to which the holding circuit of relay $R^4$ is connected by conductor 156. The energization of relay $R^4$ deenergizes solenoid H and energizes solenoid G through conductor 152. The spool of valve 20 accordingly shifts to the right admitting pressure oil from conduit 68 through port 66 and conduit 56 to the head end of motor 14, as shown in line 4 of the table. The piston of motor 14 accordingly rises and would, but for the pump 78, determine the maximum pressure in the delivery conduit 68 and at the motor 12. Check valve 76, however, prevents backflow of the delivery of pump 78 to the delivery conduit 68 of pump 70 so that the delivery of pump 78 is directed into cylinder 12 to maintain pressure therein and make up leakage losses the same as it did in cylinder 10 previously. At the same time the pump 78 also continues to make up losses and maintain pressure in motor 10. Any excess volume above the combined requirements of motors 10 and 12 is bypassed to tank at relief valve 81.

When the piston of motor 14 reaches the upper limit of its stroke limit switch $LS^5$ is opened thereby breaking the holding circuits of relays $R^1$, $R^3$ and $R^4$. These relays drop deenergizing solenoids A, F and G, respectively, and energizing solenoids B, E and H. It will be noted that the relay $R^2$ does not drop at this time even though its holding circuit be opened at relay $R^1$ and conductor 134 because the parallel circuit through conductor 132 and $LS^3$ is in closed condition at this time. Accordingly, solenoid C remains energized.

The energization of solenoids B, E and H shifted the valves 92, 18 and 20 to the opposite position as illustrated in the fifth line of the table of Figure 2. Accordingly the delivery of pump 70 is directed through check valve 76, port 48 and conduits 54 and 58 to the rod end of motor 12 and also to the rod end of motor 14. Since the latter has the advantage of a gravity bias it descends first discharging oil from the head end through conduit 56 and port 60 to tank conduit 64. When this stroke has been completed the pump delivery will then be directed to the rod end of cylinder 12 raising the piston thereof and opening the limit switch $LS^4$. This has no effect, however, since the circuit 158-160 was already opened by dropping of the relay $R^1$. Shifting of valve 92 directed the delivery from pump 78 to motor port 110 through conduit 112 and check valve 116 to the conduits 54 and 58, thus adding the delivery of pump 78 to that of the pump 70 in retracting the motors 12 and 14.

When the piston of motor 12 reaches the upper limit of its stroke, limit switch $LS^3$ is opened thus breaking the holding circuit for relay $R^2$ permitting the latter to drop which deenergizes solenoid C and energizes solenoid D. The spool 34 of valve 16 is accordingly shifted completely to the left directing the delivery from pump 70 through port 38 and motor conduit 42 to the rod end of motor 10, as shown in line 6 of the table. The piston of the latter accordingly rises and the pump 78 maintains pressure on the rod end of cylinders 12 and 14. Any excess delivery not required at these motors passes over the relief valve 114 and through conduit 118 to the motor conduit 42 thus adding to the delivery of pump 70 in raising the piston of motor 10. When the latter completes its stroke, limit switch $LS^1$ is opened thus breaking the circuit 128—130 of solenoid D and permitting the spool 34 of valve 16 to return to center position under the action of the spring 36. The parts are thus restored to their original position.

Check valve 106 prevents discharge from the head end of motor 10 while the motors 12 and 14 are returning at which time the conduit 44 would otherwise be open to tank through conduit 102 and ports 100 and 94 of valve 92. Similarly the check valve 116 prevents flow of pressure oil to tank from the rod end of cylinders 12 and 14 while the piston of motor 10 is descending.

While the form of embodiment of the invention as herein disclosed constitutes a preferred form, it is to be understood that other forms might be adopted, all coming within the scope of the claims which follow.

What is claimed is as follows:

1. In a hydraulic power transmission system having a plurality of reversible fluid motors operable in sequence, a main pump and supply conduit for supplying fluid to each of the motors, directional control valves, one for each motor, connected to said supply conduit in parallel, an auxiliary pump for supplying sufficient fluid to one of said motors to maintain full working pressure therein independently of the main pump while the main pump is supplying fluid to another motor, means for preventing back flow from said one motor to the main pump while being supplied from the auxiliary pump, a pair of auxiliary supply conduits connected one to each side of said one motor beyond the directional control valve therefor, and a directional control valve for selectively delivering the output of the auxiliary pump to either of said auxiliary supply conduits.

2. In a hydraulic power transmission system having at least three fluid motors operable in sequence, a main pump and supply conduit for supplying fluid to each of the motors, directional control valves, one for each motor, connected to said supply conduit in parallel, an auxiliary pump for supplying sufficient fluid to two of said motors to maintain full working pressure thereon independently of the main pump while the main pump is supplying fluid to another motor, means for preventing back flow from said two motors to the main pump while being supplied from the auxiliary pump, an auxiliary supply conduit unrestrictedly open to flow from the auxiliary pump to one of said two motors, means connecting the auxiliary pump to the auxiliary supply conduit, a branch supply conduit leading to the other of said two motors, and a pressure responsive sequence valve connected to cut off said branch supply conduit from the auxiliary supply conduit at pressures therein below a predetermined value.

3. In a hydraulic power transmission system having at least three reversible fluid motors operable in sequence, a main pump and supply conduit for supplying fluid to each of the motors, directional control valves, one for each motor, connected to said supply conduit in parallel, an auxiliary pump for supplying sufficient fluid to two of said motors to maintain full working pressure thereon independently of the main pump while the main pump is supplying fluid to another motor, means for preventing back flow from said two motors to the main pump while being supplied from the auxiliary pump, an auxiliary supply conduit unrestrictedly open to flow from the auxiliary pump to one of said two motors, a branch supply conduit leading to the other of said two motors, a pressure responsive sequence valve connected to cut off said branch supply conduit from the auxiliary supply conduit at pressures therein below a predetermined value, a second auxiliary supply conduit, branch supply conduit, and sequence valve, similar to the first, and connected for reverse operation of said two motors, and a directional control valve for selectively delivering the output of the auxiliary pump to either of said auxiliary supply conduits.

JAMES ROBINSON.